United States Patent
Derenick et al.

(10) Patent No.: US 9,617,011 B2
(45) Date of Patent: Apr. 11, 2017

(54) PROBABILISTIC SAFE LANDING AREA DETERMINATION

(71) Applicant: Sikorsky Aircraft Corporation, Stratford, CT (US)

(72) Inventors: Jason C. Derenick, Hamden, CT (US); Igor Cherepinsky, Sandy Hook, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 242 days.

(21) Appl. No.: 14/735,233

(22) Filed: Jun. 10, 2015

(65) Prior Publication Data

US 2016/0114905 A1    Apr. 28, 2016

Related U.S. Application Data

(60) Provisional application No. 62/016,136, filed on Jun. 24, 2014.

(51) Int. Cl.
*B64D 45/04*    (2006.01)
*G06N 7/00*    (2006.01)
(Continued)

(52) U.S. Cl.
CPC ........... *B64D 45/04* (2013.01); *G06K 9/0063* (2013.01); *G06N 7/005* (2013.01); *G08G 5/0021* (2013.01);
(Continued)

(58) Field of Classification Search
CPC ...... B64D 45/00; B64D 45/04; G05D 1/0676; G01S 1/02; G08G 5/00
See application file for complete search history.

(56) References Cited

U.S. PATENT DOCUMENTS 5,523,759 A * 6/1996 Gillberg ............... G01S 13/953
                                                    342/26 B
5,557,278 A * 9/1996 Piccirillo ............... G01S 7/003
                                                    342/29
(Continued)

FOREIGN PATENT DOCUMENTS

EP    2133662 A2    12/2009
FR    3000585 A1    7/2014
(Continued)

OTHER PUBLICATIONS

Extended EP Search Report issued on Jan. 27, 2016 in corresponding EP Patent Application No. 15173051.2.
(Continued)

*Primary Examiner* — Tuan C. To
(74) *Attorney, Agent, or Firm* — Cantor Colburn LLP (57) ABSTRACT

According to an aspect of the invention, a method of probabilistic safe landing area determination for an aircraft includes receiving sensor data indicative of current conditions at potential landing areas for the aircraft. Feature extraction on the sensor data is performed. A processing subsystem of the aircraft updates a probabilistic safe landing area map based on comparing extracted features of the sensor data with a probabilistic safe landing area model. The probabilistic safe landing area model defines probabilities that terrain features are suitable for safe landing of the aircraft. A list of ranked landing areas is generated based on the probabilistic safe landing area map.

13 Claims, 5 Drawing Sheets

(51) Int. Cl.
G08G 5/00 (2006.01)
G08G 5/02 (2006.01)
G06K 9/00 (2006.01)

(52) U.S. Cl.
CPC ......... *G08G 5/0069* (2013.01); *G08G 5/0086* (2013.01); *G08G 5/025* (2013.01)

(56) References Cited

U.S. PATENT DOCUMENTS

| | | | | |
|---|---|---|---|---|
| 5,654,890 | A * | 8/1997 | Nicosia | G01C 21/165 342/118 |
| 5,724,040 | A * | 3/1998 | Watnick | G01S 7/003 342/26 D |
| 5,907,568 | A * | 5/1999 | Reitan, Jr. | G01S 7/22 342/181 |
| 6,154,693 | A * | 11/2000 | Aberschitz | G01S 5/0054 701/120 |
| 6,577,947 | B1 * | 6/2003 | Kronfeld | G01C 21/00 701/301 |
| 8,244,455 | B2 * | 8/2012 | Case | G01C 21/005 701/123 |
| 8,521,343 | B2 * | 8/2013 | Spinelli | G05D 1/0676 701/17 |
| 8,600,589 | B2 | 12/2013 | Mendez-Rodriguez et al. | |
| 8,630,755 | B2 * | 1/2014 | Ohtomo | B64C 39/024 348/144 |
| 9,141,113 | B1 * | 9/2015 | Ivanov | G05D 1/0676 |
| 2002/0121969 | A1 * | 9/2002 | Joao | B60R 25/018 340/425.5 |
| 2004/0061777 | A1 * | 4/2004 | Sadok | G08B 17/125 348/83 |
| 2009/0055038 | A1 * | 2/2009 | Garrec | G01S 11/10 701/17 |
| 2010/0039294 | A1 * | 2/2010 | Feyereisen | G06K 9/0063 340/972 |
| 2010/0152933 | A1 * | 6/2010 | Smoot | G01C 21/165 701/16 |
| 2010/0204919 | A1 | 8/2010 | Becker et al. | |
| 2012/0029869 | A1 | 2/2012 | Muensterer et al. | |
| 2013/0008998 | A1 * | 1/2013 | Morris | B64C 27/02 244/3 |
| 2013/0035810 | A1 | 2/2013 | Spinelli | |
| 2013/0282208 | A1 * | 10/2013 | Mendez-Rodriguez | G01S 17/89 701/16 |
| 2015/0170526 | A1 * | 6/2015 | Wang | B64C 19/00 701/16 |

FOREIGN PATENT DOCUMENTS

| | | | | |
|---|---|---|---|---|
| JP | 07069299 | A | * 3/1995 | |
| JP | 2005138631 | A | * 6/2005 | |
| JP | 2007017113 | A | * 1/2007 | ............. F41H 11/12 |
| WO | 2013061066 | A2 | 5/2013 | |

OTHER PUBLICATIONS

A. Din, et al., "Embedded Low Power Controller for Autonomous Landing of Small UAVs using Neural Network," Frontiers of Information Technology (FIT), 2012 10th International Conference on. IEEE, Dec. 2012, 8 pages.

A. Johnson, et al., "Lidar-based Hazard Avoidance for Safe Landing on Mars," In: 11th AAS/AIAA Space Flight Mechanics Meeting (Feb. 2001), 38 pages.

A. Johnson, et al., "Vision-Guided Landing of an Autonomous Helicopter in Hazardous Terrain," In Proc. IEEE International Conference on Robotics and Automation, Barcelona, Apr. 2005, 6 pages.

A.E. Johnson, et al., "Analysis of Flash Lidar Field Test Data for Safe Lunar Landing," In: IEEEAC (Mar. 2010), 11 pages.

C. Lee, et al. "Unmanned Aerial Vehicle Recovery Using a Simultaneous Localization and Mapping Algorithm without the Aid of Global Positioning System," International Journal of Aeronautical and Space Sciences 11 (Jun. 2010) 12 pages.

D. Fitzgerald, "Landing Site Selection for UAV Forced Landing Using Machine Vision," Ph.D. Thesis, Queensland University of Technology, Jul. 2007, 321 pages.

L. Chamberlain, et al., "Robocopters to the Rescue: The next medevac helicopter won't need a pilot," http://spectrum.ieee.org/robotics/aerial-robots/robocopters-to-the-rescue, posted Sep. 19, 2013, 7 pages.

N. Serrano, "A Bayesian Framework for Landing Site Selection during Autonomous Spacecraft Descent," In Proc. IEEE International Conference on Intelligent Robots and Systems, Oct. 2006, 6 pages.

P.J. Garcia-Pardo, et al., "Towards Vision-based Safe Landing for an Autonomous Helicopter," Robotics and Autonomous Systems 38, Jan. 2002, 11 pages.

S. Bosch, et al., "Autonomous detection of safe landing areas for an UAV from monocular images," Oct. 2006, 6 pages.

S. Saripalli, et al., "Vision-based Autonomous Landing of an Unmanned Aerial Vehicle," In Proc. I'ntl Conference on Robotics and Automation, May 2002, 6 pages.

S. Scherer, et al., "Autonomous landing at unprepared sites by a full-scale helicopter," Robotics and Autonomous Systems, Sep. 2012, 18 pages.

Yu-Fei Shen, et al., "A Vision-Based Automatic Safe Landing-Site Detection System," Aerospace and Electronic Systems, IEEE Transactions on, vol. 49, No. 1, Jan. 2013, 18 pages.

* cited by examiner

PROBABILISTIC SAFE LANDING AREA DETERMINATION

CROSS-REFERENCE TO RELATED APPLICATIONS

This application claims the benefit of U.S. provisional patent application Ser. No. 62/016,136 filed Jun. 24, 2014, the entire contents of which are incorporated herein by reference.

BACKGROUND OF THE INVENTION

The subject matter disclosed herein generally relates to landing of an aircraft, and more particularly to determining a safe landing area for an aircraft.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they must identify a landing area prior to landing. To account for unpredictable landing area conditions, OPVs and UAVs must use a perception system to identify factors that may impede a safe landing. Current art on autonomous landing zone detection has focused on video camera-based vision systems. While images from video cameras can be valuable in identifying a safe landing area, they may not provide enough information to determine suitability of a landing area with a high level of accuracy, particularly where a degree of measurement uncertainty exists.

BRIEF DESCRIPTION OF THE INVENTION

According to an aspect of the invention, a method of probabilistic safe landing area determination for an aircraft includes receiving sensor data indicative of current conditions at potential landing areas for the aircraft. Feature extraction on the sensor data is performed. A processing subsystem of the aircraft updates a probabilistic safe landing area map based on comparing extracted features of the sensor data with a probabilistic safe landing area model. The probabilistic safe landing area model defines probabilities that terrain features are suitable for safe landing of the aircraft. A list of ranked landing areas is generated based on the probabilistic safe landing area map.

In addition to one or more of the features described above or below, or as an alternative, further embodiments could include where generating the list of ranked landing areas further includes performing a mission-level optimization to order the list of ranked landing areas according to one or more of a mission model and constraints.

In addition to one or more of the features described above or below, or as an alternative, further embodiments could include where the mission-level optimization further includes identifying a target based on one or more of the mission model and constraints, and adjusting the list of ranked landing areas to give a greater preference to a safe landing area in closer proximity to the target.

In addition to one or more of the features described above or below, or as an alternative, further embodiments could include performing geospatial partitioning of the sensor data to subdivide processing of the sensor data into a plurality of cells.

In addition to one or more of the features described above or below, or as an alternative, further embodiments could include distributing processing of the cells between a plurality of processing resources.

In addition to one or more of the features described above or below, or as an alternative, further embodiments could include collecting sensor data for the cells over a period of time, and computing slope and variance feature values of the cells based on the sensor data that are collected over the period of time.

In addition to one or more of the features described above or below, or as an alternative, further embodiments could include associating each of the cells with a feature vector computed over a time interval. Based on computing a new feature value for a cell, recursive integration of the new feature value into the probabilistic safe landing area map can be performed using a Bayesian update.

In addition to one or more of the features described above or below, or as an alternative, further embodiments could include receiving position data for the aircraft, determining positions of the potential landing areas and the aircraft based on the position data, and correlating the sensor data to the position data.

In addition to one or more of the features described above or below, or as an alternative, further embodiments could include comparing probability values in the probabilistic safe landing area map to a threshold level indicative of a safe landing area. Safe landing areas for the list of ranked landing areas can be identified based on extracting cells from the probabilistic safe landing area map that exceed the threshold level.

In addition to one or more of the features described above or below, or as an alternative, further embodiments could include sorting probability values in the probabilistic safe landing area map and selecting most likely candidates for the list of ranked landing areas based on the sorting of the probability values.

According to further aspects of the invention, a system is provided for performing a probabilistic safe landing area determination for an aircraft. The system includes a processing subsystem and memory having instructions stored thereon that, when executed by the processing subsystem, cause the system to receive sensor data indicative of current conditions at potential landing areas for the aircraft. Feature extraction on the sensor data is performed. A probabilistic safe landing area map is updated based on comparing extracted features of the sensor data with a probabilistic safe landing area model. The probabilistic safe landing area model defines probabilities that terrain features are suitable for safe landing of the aircraft. A list of ranked landing areas is generated based on the probabilistic safe landing area map.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a probabilistic safe landing area determination (SLAD) is performed for an aircraft. SLAD may be implemented in autonomous aircraft, such as optionally-piloted vehicles (OPVs) and unmanned aerial vehicles (UAVs), and/or may be provided to assist in landing area determination for a human-piloted aircraft. In exemplary embodiments, data acquired from sensors are used to refine safe landing area (SLA) maps. SLA maps, also referred to as "probabilistic SLA maps", may be cellular/grid-based representations of environmental terrain which are iteratively built via discrete-time, cell-based feature measurements. In an embodiment, to enable online probabilistic mapping via a Bayesian inference, the measurements are coupled with probabilistic models capturing the likelihood that a particular measurement or measurements indicates a safe landing area or unsafe landing area. A Bayesian inference is a statistical method of inference that uses Bayes' rule to update probability estimates as additional data values are acquired. Bayes' rule relates the probabilities of conditions before and after an observation. Each cell in a SLA map can be associated with a probability that it represents a safe landing area or an unsafe landing area either in-part (e.g., as part of a larger connected component) or fully. Since each SLA map cell may be assumed to be statistically independent, these probabilities can be readily updated in a parallel fashion.

A SLA map can be designed to integrate higher-order cell-based feature measurement which may be readily computed from temporally correlated data of an individual cell. Thus, a SLA map can embed more geospatial and temporal structure than what otherwise could be captured with a single sensor observation. For example, with simplified characterization, a safe landing area may be loosely described as being a geospatially "smooth" and "horizontal" surface. High-order feature measurements may be collected using point-based range observations of a particular cell over some fixed-interval of time before computing "slope" and "variance" feature values, for example. Accordingly, each cell in a SLA map can be associated with its own feature vector having values computed over a specified discrete-time interval. Once new feature values are computed for a particular cell, they can be recursively integrated into the SLA map via a standard (or log-odds) Bayesian update, for instance. Feature values for a particular cell may be computed only using the measurements associated with that cell; however, they may also incorporate measurements from some subset of neighboring cells within some specified or determined proximity. For example, the suitability of a cell for safe landing may be, in part, determined by the "smoothness" of the measurement (or feature) values across cellular boundaries. Using the probability values of a SLA map, safe landing areas can be extracted and ordered into a ranked list according to probability values and other factors, such as a mission model and/or other constraints.

Figure 1:
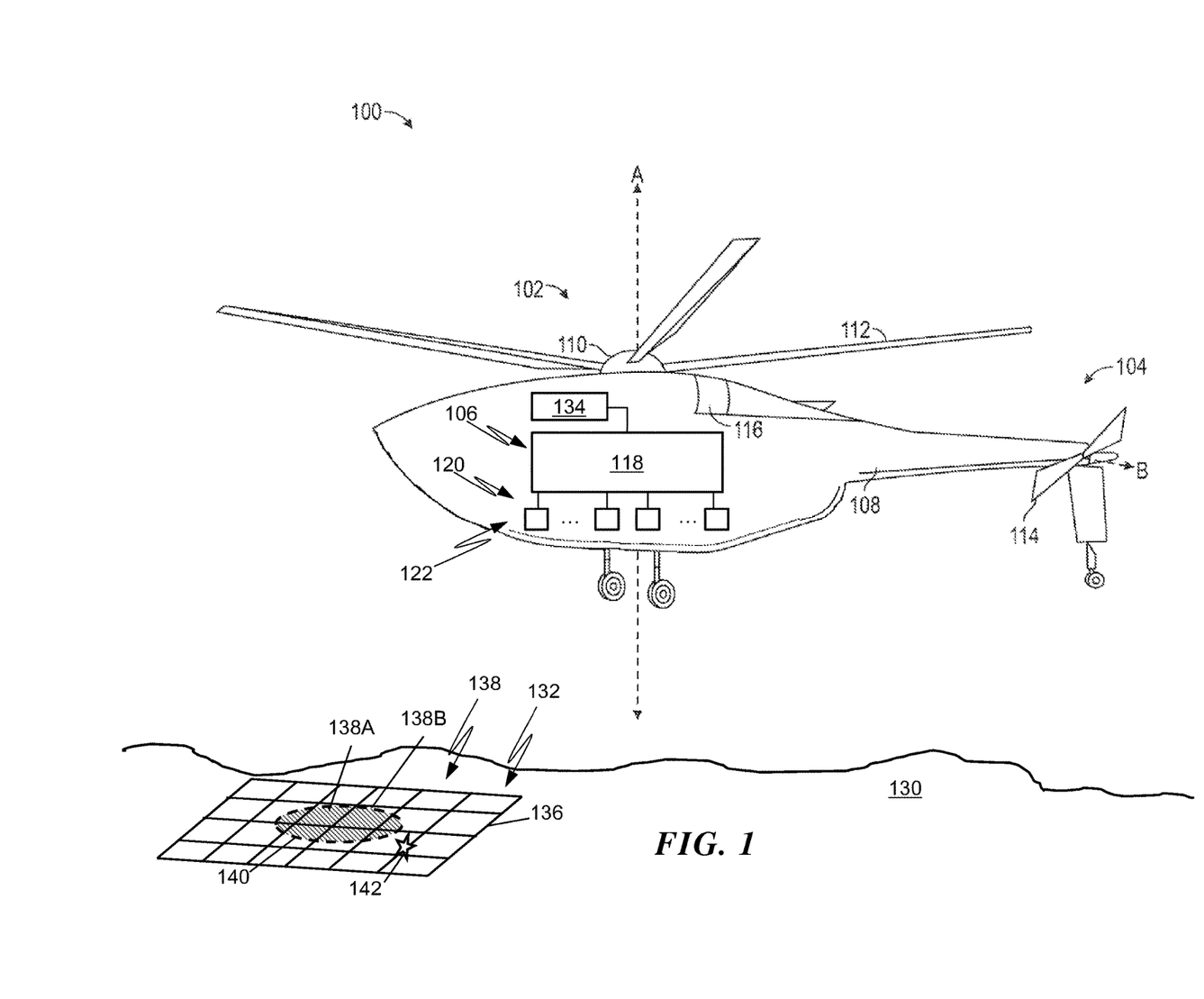
FIG. 1 is a perspective view of an exemplary rotary wing UAV aircraft according to an embodiment of the invention.

Referring now to the drawings, FIG. 1 illustrates a perspective view of an exemplary vehicle in the form of an autonomous rotary-wing unmanned aerial vehicle (UAV) 100 (also referred to as "autonomous UAV 100" or "aircraft 100") for implementing probabilistic safe landing area determination according to an embodiment of the invention. As illustrated, the autonomous UAV 100 is an aircraft that includes a main rotor system 102, an anti-torque system, for example, a tail rotor system 104, and a SLAD system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The SLAD system 106 includes an aircraft computer system 118 having one or more processing resources and memory to process sensor data acquired from a sensing system 120. The sensing system 120 may be attached to or incorporated within the airframe 108. The sensing system 120 includes one or more sensors 122. The aircraft computer system 118 processes, in one non-limiting embodiment, raw data acquired through the sensing system 120 while the autonomous UAV 100 is airborne.

The sensors 122 can capture sensor data of a terrain 130. In an embodiment, the sensors 122 may include one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture sensor data indicative of the terrain 130. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100. The navigation system 134 in combination with the sensor data may be used to determine positions or geographic locations of potential landing areas 132.

In exemplary embodiments, the aircraft computer system 118 of the SLAD system 106 observes the terrain 130 and determines current conditions at the potential landing areas 132 for the autonomous UAV 100. A geospatial grid 136 subdivides the potential landing areas 132 into a plurality of cells 138 for analysis. The geospatial grid 136 may exist as a data structure in the aircraft computer system 118, with sizing and geographic coordinates defined across an area of the terrain 130 to be observed using the sensors 122. Sensor data for the cells 138 can be collected over a period of time. Using feature extraction for visual information and/or depth information, a probabilistic safe landing area map can be developed and updated based on comparing extracted features of the sensor data with a probabilistic safe landing area model. The aircraft computer system 118 may compute slope and variance feature values of the cells 138 based on the sensor data that are collected over a period of time. As the cells 138 are analyzed, a larger safe landing area 140 may be identified according to probability values indicating a greater likelihood of a smooth and horizontal surface at an expected elevation level. Multiple cells 138 may have higher probability values indicating safer landing areas, such as cells 138A and 138B. In establishing a preferred safe landing area, the aircraft computer system 118 can check a mission model and/or other constraints to identify preferences and known risks to avoid. For instance, a mission model may establish a target 142, where a safe landing area in closer proximity to the target 142 is preferred. Accordingly, if the target 142 is identified by the aircraft computer system 118 based on a mission model and/or other constraints, a list of ranked landing areas can be adjusted to give a greater preference to a safe landing area in closer proximity to the target 142, i.e., ranking cell 138B higher than cell 138A.

Figure 2:
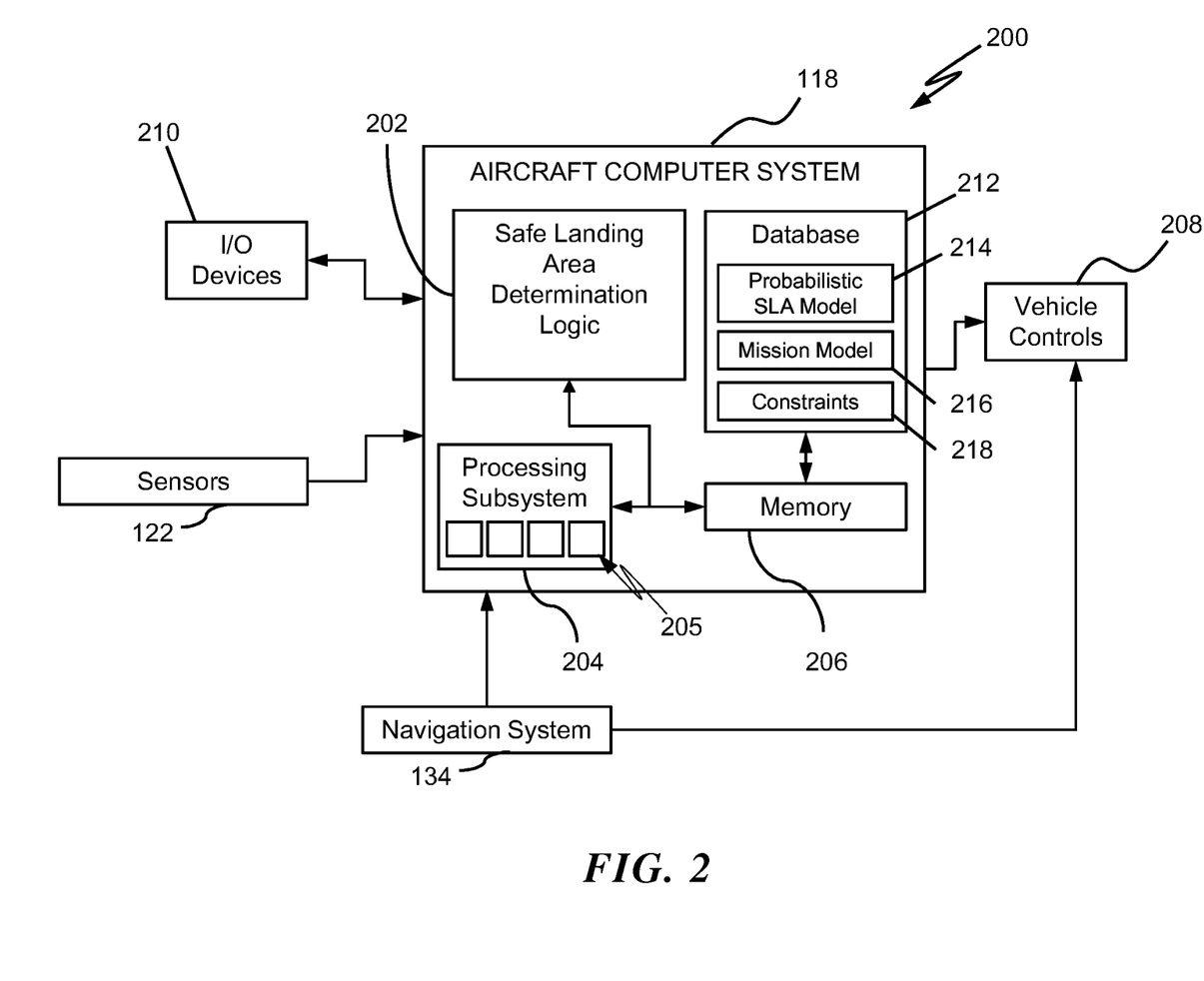
FIG. 2 is a schematic view of an exemplary computing system according to an embodiment of the invention.

FIG. 2 illustrates a schematic block diagram of a system 200 for probabilistic SLAD onboard the autonomous UAV 100 of FIG. 1 according to an exemplary embodiment. The system 200 is an embodiment of the SLAD system 106 of FIG. 1. As illustrated, the system 200 includes the aircraft computer system 118 that executes instructions for implementing SLAD logic 202. The aircraft computer system 118 receives sensor data indicative of current conditions at potential landing areas 132 of FIG. 1 from one or more sensors 122. As depicted in FIG. 2, the aircraft computer system 118 includes a memory 206 that communicates with a processing subsystem 204. The memory 206 may store the SLAD logic 202 as executable instructions that are executed by the processing subsystem 204. The memory 206 is an example of a non-transitory computer readable storage medium tangibly embodied in the aircraft computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. The processing subsystem 204 may include any number and type of processors, including a general purpose processor, a digital signal processor, a microcontroller, an application specific integrated circuit, a field programmable gate array, or the like. In an exemplary embodiment, the processing subsystem 204 include a plurality of processing resources 205, which may be separate cores or processing circuits supporting parallel computing. Although depicted as singular blocks, the processing subsystem 204 and memory 206 can be distributed between multiple processing circuits and memory subsystems. In an embodiment, the processing subsystem 204 performs additional processing tasks for the system 200.

The system 200 may include a database 212. The database 212 may be used to store a probabilistic SLA model 214, a mission model 216, constraints 218, and the like. The probabilistic safe landing area model 214 can define probabilities that terrain features are suitable for safe landing of the autonomous UAV 100 of FIG. 1. The mission model 216 may define mission-level details, such as preferred routes, targets, obstacles, and the like. The constraints 218 may define costs, known operating parameters, limits of the autonomous UAV 100 of FIG. 1, and other known values. The data stored in the database 212 may be based on one or more other algorithms or processes for implementing the SLAD logic 202. For example, in some embodiments data stored in the database 212 may be a result of the processing subsystem 204 having subjected data received from the sensors 122 and other sensors (not depicted) to one or more filtration processes. The database 212 may be used for any number of reasons. For example, the database 212 may be used to temporarily or permanently store data, to provide a record or log of the data stored therein for subsequent examination or analysis, etc. In some embodiments, the database 212 may store a relationship between data, such as one or more links between data or sets of data acquired through the modalities onboard the autonomous UAV 100 of FIG. 1.

The system 200 may provide one or more controls, such as vehicle controls 208. The vehicle controls 208 may provide directives based on, e.g., data associated with the navigation system 134. Directives provided by the vehicle controls 208 may include navigating or positioning the autonomous UAV 100 of FIG. 1 to a safe landing area. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processing subsystem 204.

Figure 3:
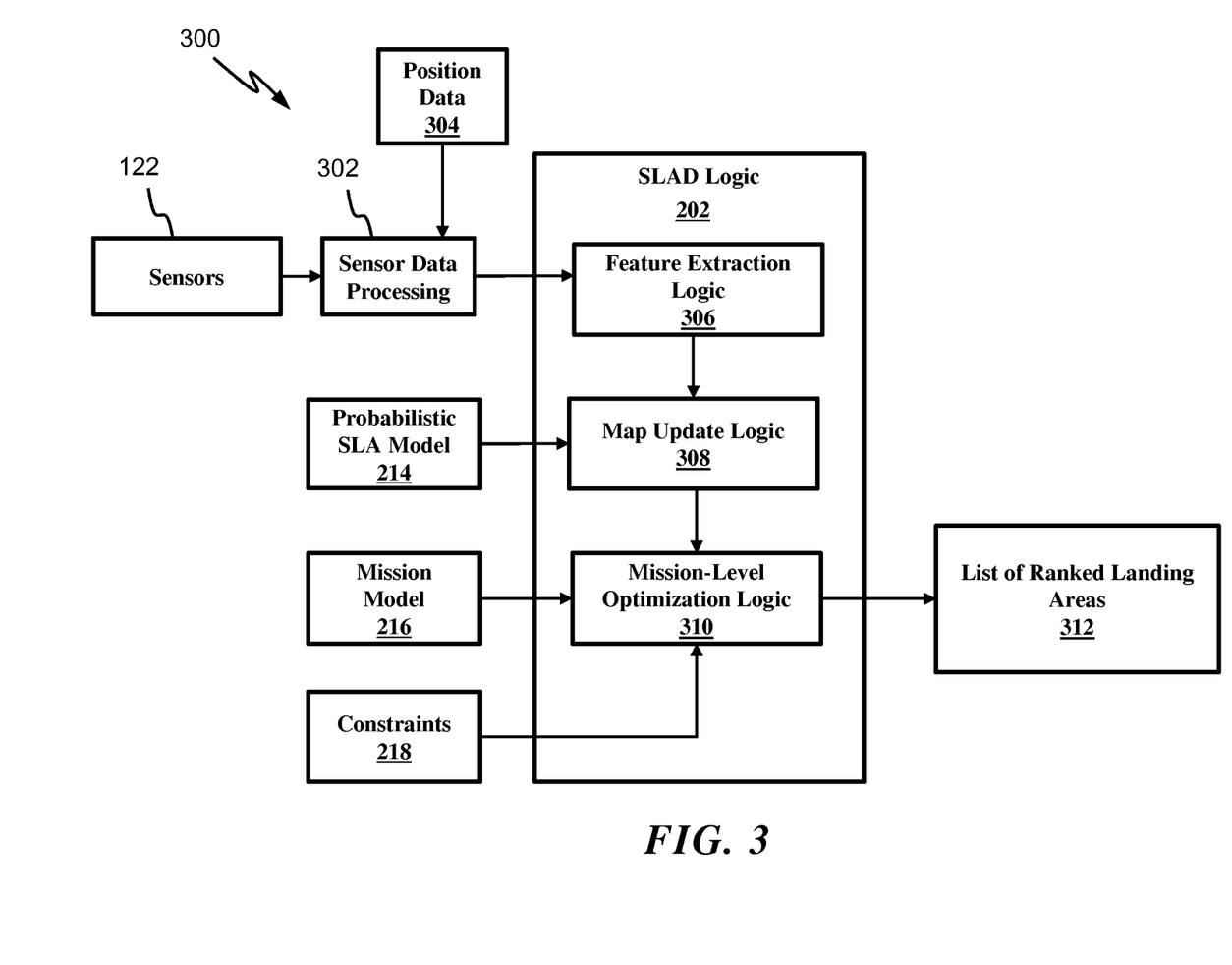
FIG. 3 illustrates a dataflow diagram for probabilistic safe landing area determination according to an embodiment of the invention.

FIG. 3 illustrates an exemplary data flow diagram 300 that is performed by the processing subsystem 204 of FIG. 2 for implementing the SLAD logic 202. Sensor data indicative of current conditions at potential landing areas 132 of FIG. 1 for the autonomous UAV 100 of FIG. 1 are received at sensor data processing 302 from the sensors 122. The sensor data processing 302 may also receive position data 304, for example, from the navigation system 134 of FIGS. 1 and 2. The position data 304 received for the autonomous UAV 100 of FIG. 1 may be used to determine positions of the potential landing areas 132 of FIG. 1 and the autonomous UAV 100 of FIG. 1. The sensor data from the sensors 122 can be correlated to the position data 304 to determine physical alignment between sensor data and geospatial positions of the geospatial grid 136 of FIG. 1. In an exemplary embodiment, the SLAD logic 202 includes feature extraction logic 306, map update logic 308, and mission-level optimization logic 310; however, it will be understood that the mission-level optimization logic 310 may be omitted or combined with other logic.

The sensor data processing 302 can provide the sensor data to the feature extraction logic 306. The feature extraction logic 306 performs feature extraction on the sensor data. The feature extraction logic 306 may perform known detection techniques to identify or filter out features. For example, pattern matching using a scale-invariant feature transform can search for specific shapes. Depth data can be checked for substantial uniformity over geospatial locations. Data sets defining planes over the same geospatial area can be used for feature extraction and increased confidence in safe landing zone vs. unsafe landing zone determinations. For instance, a road may visually have a substantially rectangular appearance defined by observed edges and may have a substantially smooth surface defined by depth measurements. Using a grid, such as the geospatial grid 136 of FIG. 1, data processing in the processing subsystem 204 of FIG. 2 can be partitioned according to the cells 138 of FIG. 1 as separate observation areas for analysis. Accordingly, as sensor data for the cells 138 of FIG. 1 are collected over a period of time, values such as slope and variance feature values of the cells 138 of FIG. 1 can be computed.

The map update logic 308 can update a probabilistic safe landing area map based on comparing extracted features of the sensor data with the probabilistic safe landing area model 214. Probabilistic values in the probabilistic safe landing area map may be updated using a Bayesian inference relative to features extracted from the sensor data. The SLAD logic 202 can generate a list of ranked landing areas 312 based on the probabilistic safe landing area map. Probability values in the probabilistic safe landing area map may be compared to a threshold level indicative of a safe landing area. Safe landing areas for the list of ranked landing areas 312 may be identified based on extracting cells from the probabilistic safe landing area map that exceed the threshold level. Alternatively or in combination with threshold level comparison, probability values in the probabilistic safe landing area map can be sorted and most likely candidates for the list of ranked landing areas 312 selected based on the sorting of the probability values.

As part of generating the list of ranked landing areas 312, the mission-level optimization logic 310 can also perform a mission-level optimization to order the list of ranked landing areas 312 according to one or more of a mission model 216 and constraints 218. A target, such as target 142 of FIG. 1, may be defined in the mission model 216 or constraints 218. When the mission-level optimization logic 310 identifies the target 142 of FIG. 1, the list of ranked landing areas 312 can be adjusted to give a greater preference to a safe landing area in closer proximity to the target 142 of FIG. 1. Depending upon preferences and limitations defined in the mission model 216 and/or constraints 218, other adjustments to ordering in the list of ranked landing areas 312 can be made to raise or lower respective rankings.

Figure 4:
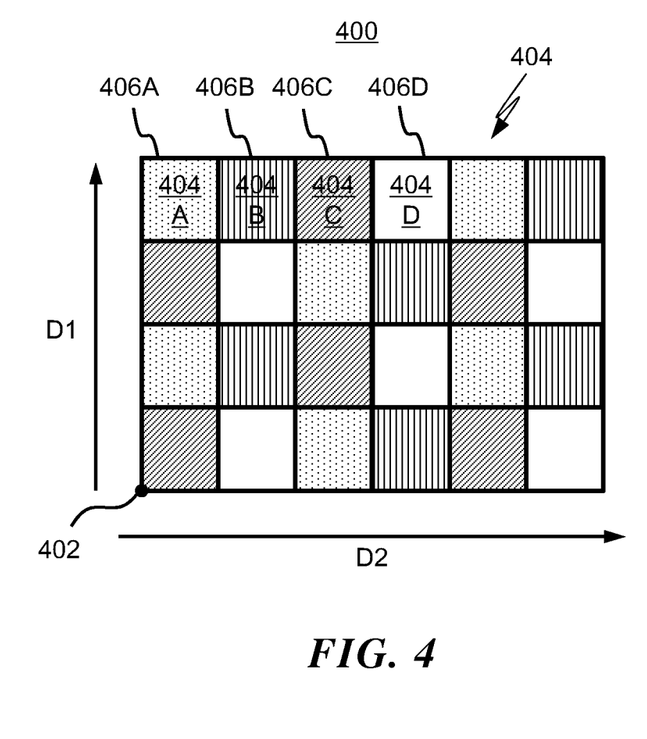
FIG. 4 illustrates an example of interlaced geographic partitioning.

FIG. 4 illustrates an example of interlaced geographic partitioning of a grid 400 as an embodiment of the geospatial grid 136 of FIG. 1. The grid 400 is defined relative to an origin point 402 and extends in two directions D1, and D2. D1 can be defined as northward distances, and D2 can be defined as eastward distances relative to the origin point 402. The grid 400 may be formed by performing geospatial partitioning of sensor data from the sensors 122 of FIGS. 1-3 to subdivide processing of the sensor data into a plurality of cells 404. Each of the cells 404 of the grid 400 represents a geographic area similar to the cells 138 of FIG. 1. The cells 404 can be substantially uniform in size. In the example of FIG. 4, an interlaced pattern is used to process sensor data and subsequent values associated with cells 404, such that a first processing thread 406A processes data associated with cell 404A, a second processing thread 406B processes data associated with cell 404B, a third processing thread 406C processes data associated with cell 404C, and a fourth processing thread 406D processes data associated with cell 404D. The processing threads 406A-406D are distributed according to like patterned cells 404 in FIG. 4 such that a given processing thread 406 does not act upon directly neighboring cells 404. The processing threads 406A-406D can map to separate processing resources 205 of FIG. 2. This represents one example of distributed processing of the cells 404 between the processing resources 205 of FIG. 2 to perform parallel processing.

Figure 5:
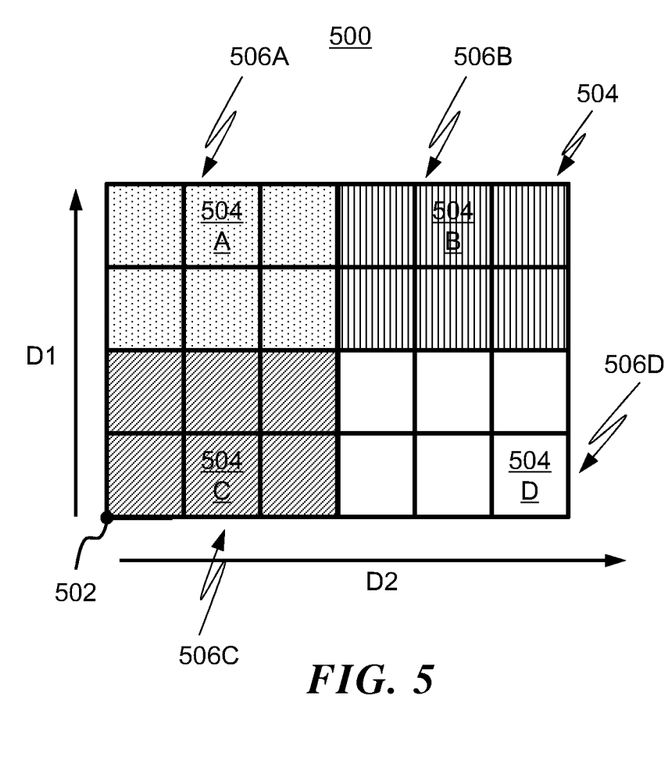
FIG. 5 illustrates an example of local geographic partitioning.

FIG. 5 illustrates an example of local geographic partitioning of a grid 500 as an embodiment of the geospatial grid 136 of FIG. 1. The grid 500 is defined relative to an origin point 502 and extends in two directions D1, and D2. D1 can be defined as northward distances, and D2 can be defined as eastward distances relative to the origin point 502. The grid 500 may be formed by performing geospatial partitioning of sensor data from the sensors 122 of FIGS. 1-3 to subdivide processing of the sensor data into a plurality of cells 504. Each of the cells 504 of the grid 500 represents a geographic area similar to the cells 138 of FIG. 1. The cells 504 can be substantially uniform in size. In the example of FIG. 5, a localized grouping pattern is used to process sensor data and subsequent values associated with cells 504, such that a first processing thread 506A processes data associated with cell 504A, a second processing thread 506B processes data associated with cell 504B, a third processing thread 506C processes data associated with cell 504C, and a fourth processing thread 506D processes data associated with cell 504D. The processing threads 506A-506D are distributed according to like patterned cells 504 in FIG. 5, such that a given processing thread 506 can act upon directly neighboring cells 504. For instance, groups of six geographically neighboring cells 504 are operated on by each respective processing thread 506. The processing threads 506A-506D can map to separate processing resources 205 of FIG. 2. This represents another example of distributed processing of the cells 504 between the processing resources 205 of FIG. 2 to perform parallel processing.

While the examples of FIGS. 4 and 5 depict particular grid sizes and processing thread distributions, these are merely two examples. Other distributions including a larger or smaller number of cells per grid and processing threads are also contemplated. For example, processing threads may be assign on a row or column basis for a particular grid arrangement.

Figure 6:
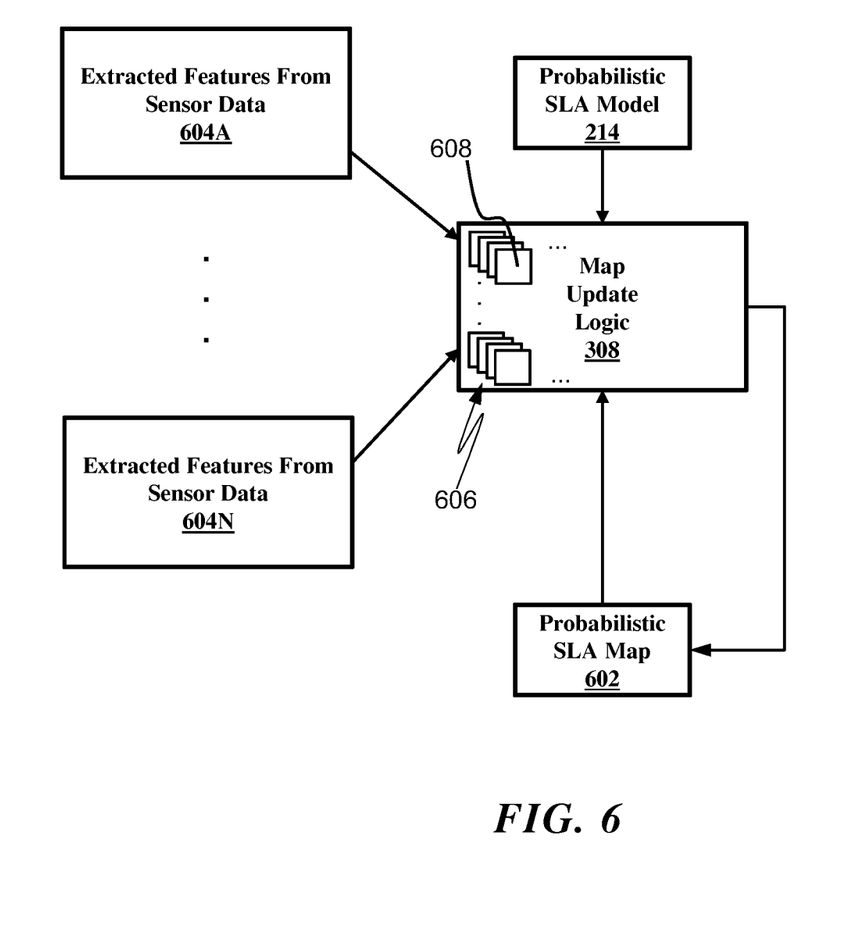
FIG. 6 illustrates an example of recursively updating a probabilistic safe landing area map.

FIG. 6 illustrates an example of recursively updating a probabilistic SLA map 602. In the example of FIG. 6, the map update logic 308 receives extracted features from sensor data 604A-604N that map to specific sensors or sensor types of the sensors 122 of FIGS. 1-3. Feature vectors 606 are formed for cell positions 608 that align with each of the cells 138 of FIG. 1. The cell positions 608 can align with the grid 400 or 500 of FIGS. 4 and 5 to support various parallel processing embodiments. The map update logic 308 also receives the probabilistic SLA model 214 and a past value of the probabilistic SLA map 602 to update the probabilistic SLA map 602. Sensor data for the cells 138 of FIG. 1 at cell positions 608 can be collected over a period of time. Slope and variance feature values of the cells 138 of FIG. 1 at cell positions 608 can be computed based on the sensor data that are collected over the period of time. Each of the cells 138 of FIG. 1 at cell positions 608 may be associated with a feature vector 606 computed over a time interval. Based on computing a new feature value for a cell 138 of FIG. 1, recursive integration of the new feature value into the probabilistic SLA map 602 can be performed using a Bayesian update. Other probability adjustment techniques known in the art are also contemplated.

Technical effects include performing a probabilistic safe landing area determination for an aircraft. Probability values of a safe landing area can be adjusted as more observations are made over time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of performing a probabilistic safe landing area determination for an aircraft, the method comprising:
    receiving sensor data indicative of current conditions at potential landing areas for the aircraft;
    performing feature extraction on the sensor data;
    performing geospatial partitioning of the sensor data to subdivide processing of the sensor data into a plurality of cells;
    collecting sensor data for the cells over a period of time; and
    computing slope and variance feature values of the cells based on the sensor data that are collected over the period of time;
    updating, by a processing subsystem of the aircraft, a probabilistic safe landing area map based on comparing extracted features of the sensor data with a probabilistic safe landing area model, the probabilistic safe landing area model defining probabilities that terrain features are suitable for safe landing of the aircraft; and
    generating a list of ranked landing areas based on the probabilistic safe landing area map.

2. The method of claim 1, wherein generating the list of ranked landing areas further comprises performing a mission-level optimization to order the list of ranked landing areas according to one or more of a mission model and constraints.

3. The method of claim 2, wherein the mission-level optimization further comprises identifying a target based on one or more of the mission model and constraints, and adjusting the list of ranked landing areas to give a greater preference to a safe landing area in closer proximity to the target.

4. The method of claim 1, further comprising:
    distributing processing of the cells between a plurality of processing resources.

5. The method of claim 1, further comprising:
    associating each of the cells with a feature vector computed over a time interval; and
    based on computing a new feature value for a cell, performing recursive integration of the new feature value into the probabilistic safe landing area map using a Bayesian update.

6. The method of claim 1, further comprising:
    receiving position data for the aircraft;
    determining positions of the potential landing areas and the aircraft based on the position data; and
    correlating the sensor data to the position data.

7. The method of claim 1, further comprising:
    comparing probability values in the probabilistic safe landing area map to a threshold level indicative of a safe landing area; and
    identifying safe landing areas for the list of ranked landing areas based on extracting cells from the probabilistic safe landing area map that exceed the threshold level.

8. The method of claim 1, further comprising:
    sorting probability values in the probabilistic safe landing area map; and
    selecting most likely candidates for the list of ranked landing areas based on the sorting of the probability values.

9. A system for performing a probabilistic safe landing area determination for an aircraft, the system comprising:
    a processing subsystem; and
    memory having instructions stored thereon that, when executed by the processing subsystem, cause the system to:
        receive sensor data indicative of current conditions at potential landing areas for the aircraft;
        perform feature extraction on the sensor data;
        perform geospatial partitioning of the sensor data to subdivide processing of the sensor data into a plurality of cells;
        collect sensor data for the cells over a period of time; and
        compute slope and variance feature values of the cells based on the sensor data that are collected over the period of time;
        update a probabilistic safe landing area map based on comparing extracted features of the sensor data with a probabilistic safe landing area model, the probabilistic safe landing area model defining probabilities that terrain features are suitable for safe landing of the aircraft; and
        generate a list of ranked landing areas based on the probabilistic safe landing area map.

10. The system of claim 9, wherein generation of the list of ranked landing areas further comprises performance of a mission-level optimization to order the list of ranked landing areas according to one or more of a mission model and constraints.

11. The system of claim 9, wherein geospatial partitioning of the sensor data is performed to subdivide processing of the sensor data into a plurality of cells and distribute processing of the cells between a plurality of processing resources of the processing subsystem.

12. The system of claim 11, wherein the memory further comprises instructions stored thereon that, when executed by the processing subsystem, cause the system to:
    collect sensor data for the cells over a period of time; and
    compute slope and variance feature values of the cells based on the sensor data that are collected over the period of time.

13. The system of claim 11, wherein the memory further comprises instructions stored thereon that, when executed by the processing subsystem, cause the system to:
    associate each of the cells with a feature vector computed over a time interval; and
    based on computing a new feature value for a cell, recursive integration of the new feature value into the probabilistic safe landing area map is performed using a Bayesian update.

* * * * *